United States Patent Office 3,430,985
Patented Mar. 4, 1969

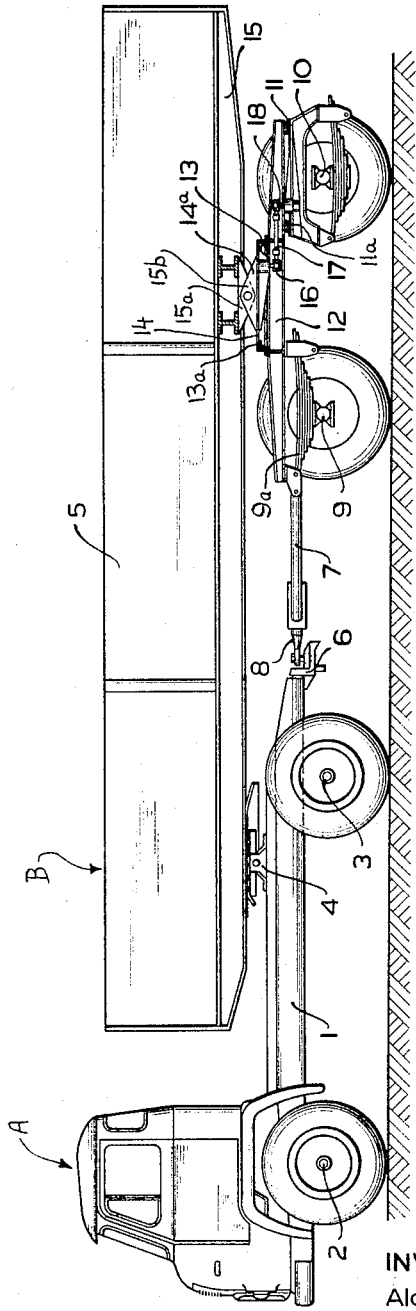

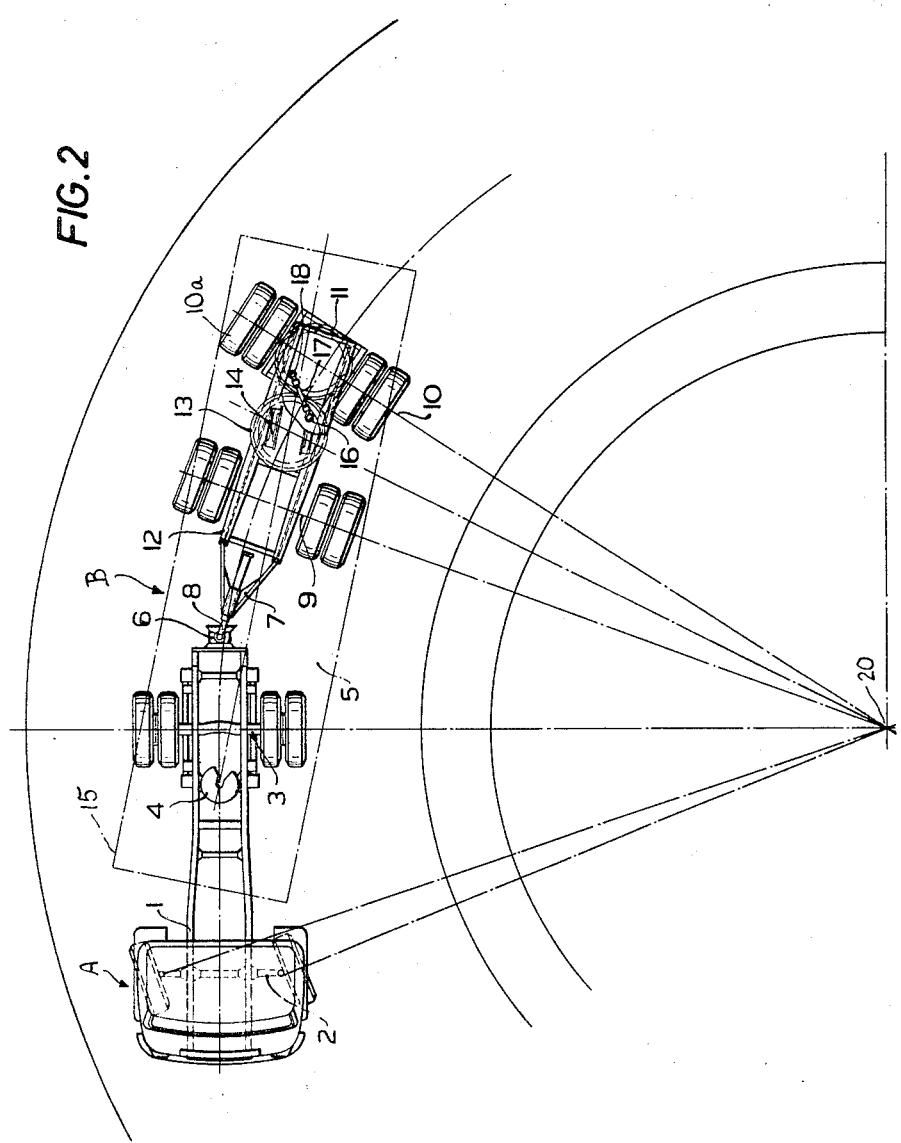

3,430,985
TRACTOR AND TRAILER CONSTRUCTION
Willi Hildebrandt, Parkring 7, Emmerich, Germany, and Aloysius T. van Huet, Schoolstraat 9, Pannerden, Netherlands
Continuation-in-part of application Ser. No. 428,668, Jan. 28, 1965. This application Jan. 6, 1967, Ser. No. 607,721
Claims priority, application Germany, Feb. 1, 1964, H 51,550; Jan. 7, 1966, H 58,176
U.S. Cl. 280—426    11 Claims
Int. Cl. B62d 53/06

ABSTRACT OF THE DISCLOSURE

A tractor and semitrailer construction wherein the truck frame of the semitrailer is articulately hitched to the rear end of the tractor frame by a variable-length stabilizer. The rear axle of the truck frame is mounted on an element of a first antifriction bearing which is rotatable with reference to the truck frame about a first vertical axis, and the truck frame is mounted on a second antifriction bearing one member of which is carried by the semitrailer frame and is rotatable with reference to the truck frame about a second vertical axis. A motion transmitting device connects the one element of the first bearing with the one member of the second bearing in such a way that the rear axle turns about the first axis in a clockwise direction when the semitrailer frame turns about the second axis in a counterclockwise direction, or vice versa.

Cross-reference to the related application

This is a continuation-in-part of our copending application Ser. No. 428,668 filed Jan. 28, 1965, for "Steering Arrangement for Tandem Axles," now Patent No. 3,338,-592 granted Aug. 29, 1968.

Background of the invention

The present invention relates to a tractor and trailer construction in general, and more particularly to improvements in the steering arrangements for tractors and semitrailer constructions.

It is an important object of our invention to further improve the steering arrangement which is disclosed in our aforementioned copending application Ser. No. 428,-668, particularly as regards the simplicity of the truck frame which carries the wheel-supporting axles of the semitrailer and also as regards the stability of the semitrailer during travel in a curve.

Another object of the invention is to provide a novel stabilizing connection between the truck frame of the semitrailer and the frame of the towing vehicle.

A further object of the invention is to provide a simple, rugged, compact and reliable motion transmitting connection between the frame of the semitrailer and the rear axle of the truck frame.

A concomitant object of the invention is to provide a tractor and semitrailer construction wherein the connections between the frames of the semitrailer and the frame of the towing vehicle insure satisfactory and safe guidance of the semitrailer during forward or rearward travel in a straight and/or arcuate path.

Still another object of the present invention is to provide a tractor and semitrailer construction wherein the semitrailer is coupled to the frame of the towing vehicle at a plurality of points.

An additional object of the invention is to provide a construction of the above outlined character wherein the axes of all wheels intersect each other in a single point when the tractor is caused to travel in an arcuate path.

Summary of the invention

The invention resides in the provision of a tractor and semitrailer construction which comprises a tractor or towing vehicle having a tractor frame and hitch means provided in the region of the rear end of the tractor frame, a semitrailer frame having a front portion provided with a fifth wheel which is coupled to the tractor frame forwardly of the hitch means, a truck frame located rearwardly of the hitch means below the semitrailer frame, antifriction bearing means having a first bearing member fixed to the truck frame and a second bearing member carried by the semitrailer frame and turnable by the latter relative to the first bearing member about a substantially vertical axis, and stabilizer means of variable length connecting the hitch means with the truck frame.

In accordance with another feature of our invention, the truck frame carries a front axle and a rear axle. The rear axle is connected to the truck frame by a second antifriction bearing having a first bearing element fixed to the truck frame and a second bearing element fixed to the rear axle and turnable with reference to the first bearing element about a second substantially vertical axis. A motion transmitting rod connects the second bearing member of the first bearing to the second bearing element of the second bearing in such a way that the rear axle is turned about the second axis in a clockwise direction when the semitrailer frame turns the second bearing member of the first bearing in a counterclockwise direction about the first axis, or vice versa.

The novel features which are considered as characteristic of the invention are set forth in particular in the appended claims. The improved tractor and trailer combination itself, however, both as to its construction and the mode of manipulating the same, together with additional features and advantages thereof, will be best understood upon perusal of the following detailed description of certain specific embodiments with reference to the accompanying drawing.

Brief description of the drawing

FIG. 1 is a schematic side elevational view of a tractor and trailer combination which embodies our invention; and FIG. 2 is a top plan view showing the tractor and trailer combination during travel in a left-hand curve.

Description of the preferred embodiments

FIG. 1 illustrates a tractor and trailer construction which comprises a towing vehicle or tractor A and a semitrailer B. The tractor A includes a tractor frame 1 which carries a front axle 2, a rear axle 3 and a hitch 6 located rearwardly of the axle 3. The semitrailer B comprises a trailer frame 15 supporting an enclosure 5 for goods and having at or close to its front end a fifth wheel 4 which is coupled to the tractor frame 1 in the customary way at a point forwardly of the connector or hitch 6 and rear axle 3. The rear portion of the trailer frame 15 is connected with a truck frame 12 by means of a transversely extending horizontal pivot 15b. The pivot 15b couples a bracket 15a of the trailer frame 15 with a bracket 14a on a motion transmitting plate 14 which is rigid or integral with an upper annular bearing member 13 forming part of a first antifriction bearing and being rotatable about a vertical axis with reference to a complementary lower annular bearing member 13a which is fixed to or is integral with the truck frame 12. Balls or analogous rolling elements are interposed between the bearing members 13 and 13a.

The truck frame 12 carries a front axle 9 which is rigidly secured thereto, i.e., it cannot turn with reference to the truck frame but is of course movable and tiltable up and down in response to deformation of customary leaf springs 9a.

The truck frame 13 further carries a rear axle 10 which is connected thereto by means of a second antifriction bearing including a lower annular bearing element 11 which is rigid with the axle 10 and an upper annular bearing element 11a which is rigid with the truck frame 12. The bearing elements 11, 11a are rotatable on balls or rollers with reference to each other about a second vertical axis, and it will be noted that the axles 9, 10 are located at the opposite sides of the pivot 15b. The axis of the pivot 15b intersects the axis of the first antifriction bearing which includes the bearing members 13, 13a.

In accordance with a feature of our invention, the tractor and trailer combination further comprises a stabilizer unit including a forked member 7 whose prongs are pivotably coupled to the front end of the truck frame 12 and whose front end portion carires a coupling 8 which is detachably secured to the hitch 6. The coupling 8 of the forked member 7 comprises two slidably connected portions one of which is telescoped into the other to allow for shortening or lengthening of the stabilizer unit in response to turning of the frame 1 with reference to the frame 12 or vice versa. The hitch 6 and stabilizer unit 7, 8 need not transmit traction when the tractor A travels forwardly, i.e., they merely serve to swing the truck frame 12 to the right or to the left when the tractor A travels in a curve. Motion from the tractor A to the semitrailer B is transmitted solely through the fifth wheel 4.

A motion transmitting rod 17 is provided to turn the rear axle 10 in response to turning of the upper bearing member 13 with reference to the lower bearing member 13a. The ends of the rod 17 are connected to pivots 16, 18 which are respectively mounted on the upper bearing member 13 and lower bearing element 11. Each of the pivots 16, 18 preferably comprises a ball joint. The rod 17 is inclined with reference to the longitudinal direction of the trailer frame 15 and its purpose is to turn the bearing element 11 and rear axle 10 of the truck frame 12 in a clockwise direction when the trailer frame 15 turns the bearing member 13 in a counterclockwise direction, or vice versa.

As shown in FIG. 2, the tractor and trailer combination travels in a left-hand curve. The trailer frame 15 turns the upper bearing member 13 in a counterclockwise direction whereby the rod 17 compels the lower bearing element 11 to turn the rear axle 10 in a clockwise direction. This enables the wheels 10a on the rear axle 10 to travel in an arcuate path whose center 20 of curvature is intersected by the axes of all wheels including the wheels on the axles 2, 3 of the tractor frame 1 and the wheels on the axles 9, 10 of the truck frame 12.

It will be seen that the trailer frame 15 transmits torque to the rear axle 10 of the truck frame 12. In the absence of the stabilizer unit 7, the truck frame 12 could turn about the axis of the bearing member 13 and beyond the position shown in FIG. 2 to cause swaying of the tractor and trailer combination and eventual radially outward movement of the entire truck frame 12, especially if the friction between the wheels and the road surface is relatively low. The stabilizer unit 7 prevents such undesirable movements of the truck frame 12 even though it does not serve to transmit any motion in the longitudinal direction of the truck frame 12, i.e., it merely pivots the truck frame about the common axis of the bearing members 13, 13a to the extent determined by the angular position of the tractor frame 1.

The power flow in the improved tractor and trailer combination is as follows: If the driver of the tractor A moves the wheels on the front axle 2 into a left-hand or right-hand curve, the fifth wheel 4 causes the trailer frame 15 to pivot about the axis of the bearing member 13. The pivot 16 on the bearing member 13 causes the rod 17 to turn the bearing element 11 which latter turns the rear axle 10. Friction between the wheels of the truck frame 12 and the road surface is sufficient to maintain the truck frame in requisite position because the truck frame is held against lateral swaying by the stabilizer unit 7, 8. The friction varies in dependency on the condition of the road surface between two extremes (icy road and very rough road surface) but the stabilizer unit 7, 8 invariably insures that the truck frame 12 enters and remains in the curve in an optimum position. If the friction between the wheels of the axles 9, 10 and the road surface is weak, the stabilizer unit 7, 8 takes up excessive forces which tend to hurl the truck frame 12 from the prescribed path.

If the tractor A is driven in reverse and is caused to travel in an arc, the hitch 6 moves laterally and entrains the coupling 8 to pivot the truck frame 12 about the axis of the bearing member 13. The rear axle 10 shares such movement and the rod 17 transmits motion to the upper bearing member 13 to change the angular position of the trailer frame 15. Thus, the stabilizer unit 7, 8 insures that the frames 12, 15 assume optimum positions to take a curve when the tractor A travels rearwardly or forwardly. The steering operation is very simple and requires no special steering movements which are necessary for proper manipulation of conventional tractor and semitrailer combinations. In fact, steering of our combination in forward or reverse is just as simple as that of a passenger car.

The feature shown in FIGURE 2 (that the axes of all wheels intersect each other in the center 20 of curvature of an arcuate road section) is achieved by the provision of the aforementioned stabilizer unit 7, 8 and by proper selection of the distance between the axis of the fifth wheel 4 and hitch 6. Furthermore, the construction of the truck frame 12 is simplified because the front axle 9 can be rigidly affixed to such truck frame. The tractor and trailer combination remains in the lane of the wheels on the front axle 2 of the tractor A irrespective of the length of the semitrailer B.

The pivot 15b between the frames 15 and 12 is preferably constructed in a manner as disclosed in our copending application Ser. No. 428,668. Thus, this pivot can comprise a hollow horizontal shaft which rotates unidirectionally in response to tilting of the brackets 14a, 15a, with reference to each other to insure uniform wear. The ends of the hollow shaft carry stop washers and the shaft receives a bolt which cooperates with such stop washers to hold the shaft against axial movement. Shock absorbers may be provided for the hollow shaft and/or its bolt.

The rod 17 is preferably of adjustable length. If desired, the motion transmitting connection between the bearing member 13 and bearing element 11 may comprise two rods 17.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A tractor and trailer combination, comprising a tractor having a tractor frame; a trailer frame having a front portion provided with a fifth wheel coupled to said tractor frame; a truck frame located rearwardly of said tractor frame below said trailer frame; front wheel-supporting axle means mounted on said truck frame; rear wheel-supporting axle means; first antifriction bearing means connecting said rear axle means to said truck frame for pivotal movement about a first substantially vertical axis; second antifriction bearing means having a first bearing member fixed to said truck frame and a second bearing member carried by said trailer frame and being rotatable by said trailer frame with reference to said first bearing member about a second substantially vertical axis; and stabilizer means of variable length connecting said truck frame with said tractor frame.

2. A construction as defined in claim 1, wherein said tractor further comprises connector means provided on said tractor frame rearwardly of said fifth wheel, said stabilizer means being articulately connected to said connector means and to the front end of said truck frame.

3. A construction as defined in claim 2, wherein said stabilizer means comprises a first portion attached to said connector means and a second portion attached to said truck frame, one of said portions being slidably telescoped into the other portion.

4. A tractor and trailer construction, comprising a tractor having a tractor frame; a trailer frame having a front portion provided with a fifth wheel coupled to said tractor frame; a truck frame located rearwardly of said tractor frame below said trailer frame; antifriction bearing means having a first bearing member fixed to said truck frame and a second bearing member carried by said trailer frame, said second bearing member being rotatable by said trailer frame with reference to said first bearing member about a first substantially vertical axis; stabilizer means of variable length connecting said truck frame with said tractor frame; front wheel-supporting axle means attached to said truck frame; rear wheel-supporting axle means; second antifriction bearing means comprising a first bearing element fixed to said truck frame and a second bearing element fixed to said rear axle means and being rotatable with reference to said first bearing element about a second substantially vertical axis; and motion transmitting means operatively connected to said rear axle means and to said second bearing member for rotating said second bearing element in a clockwise direction in response to rotation of said second bearing member in a counterclockwise direction, or vice versa.

5. A construction as defined in claim 4, wherein said front axle means is rigidly affixed to said truck frame.

6. A tractor and trailer combination, comprising a tractor having a tractor frame; a trailer frame having a front portion provided with a fifth wheel coupled to said tractor frame; a truck frame located rearwardly of said tractor frame below said trailer frame; antifriction bearing means having a first bearing member fixed to said truck frame and a second bearing member carried by said trailer frame and being rotatable by said trailer frame with reference to said first bearing member about a first substantially vertical axis; stabilizer means of variable length connecting said truck frame with said tractor frame; front wheel-supporting axle means attached to said truck frame; rear wheel-supporting axle means; second antifriction bearing means comprising a first bearing element fixed to said truck frame and a second bearing element fixed to said rear axle means and being rotatable with reference to said first bearing element about a second substantially vertical axis; and motion transmitting means for rotating said second bearing element in a clockwise direction in response to rotation of said second bearing member in a counterclockwise direction, or vice versa, said motion transmitting means comprising a rod having first and second end portions, first pivot means connecting one of said end portions to said second bearing member and second pivot means connecting the other end portion to said second bearing element.

7. A construction as defined in claim 6, wherein each of said pivot means comprises a ball joint.

8. A construction as defined in claim 6, further comprising horizontal pivot means extending transversely of and connecting said trailer frame with said second bearing member.

9. A construction as defined in claim 2, wherein said connector means is arranged to merely pivot said truck frame about said first axis when the tractor travels forwardly and wherein said fifth wheel is arranged to transmit motion from said tractor frame to said trailer frame.

10. A construction as defined in claim 4, wherein said front and rear axle means are respectively located forwardly and rearwardly of said first axis and wherein said motion transmitting means comprises a rod which is inclined with reference to the longitudinal direction of said trailer frame.

11. A construction as defined in claim 4, wherein said bearing members and said bearing elements are respectively constituted by pairs of annuli and wherein each of said antifriction bearing means further comprises rolling elements between the respective annuli.

References Cited

UNITED STATES PATENTS

| 2,520,776 | 8/1950 | Page | 280—404 |
| 2,794,655 | 6/1957 | Charette | 280—426 |
| 3,338,592 | 8/1967 | Hildebrandt et al. | 280—81 |

FOREIGN PATENTS

| 1,142,060 | 3/1957 | France. |
| 1,379,824 | 10/1963 | France. |

LEO FRIAGLIA, *Primary Examiner.*

U.S. Cl. X.R.

280—81